No. 704,744. Patented July 15, 1902.
H. HEINICKE.
ELECTRIC ACCUMULATOR.
(Application filed Apr. 28, 1902.)
(No Model.)

Witnesses:

Inventor:
Hermann Heinicke
by E. Witte
Attorney.

UNITED STATES PATENT OFFICE.

HERMANN HEINICKE, OF SCHOENEBERG, NEAR BERLIN, GERMANY.

ELECTRIC ACCUMULATOR.

SPECIFICATION forming part of Letters Patent No. 704,744, dated July 15, 1902.

Application filed April 28, 1902. Serial No. 105,058. (No model.)

*To all whom it may concern:*

Be it known that I, HERMANN HEINICKE, a subject of the German Emperor, residing in Schoeneberg, near Berlin, in the Kingdom of Prussia, Germany, have invented certain new and useful Improvements in Electric Accumulators, of which the following is a specification.

My invention relates to an improved electrode for secondary batteries. The electrically-conducting base carrying the active material presents grooves or channels of any suitable shape running from top to bottom. Inwardly-slanting horizontal strips or brackets are provided connecting the outer portions of the groove formed by any two or more adjacent walls. When the active material is filled into the grooves, it is penetrated by these strips, whereby it is firmly held together and other advantages secured.

My invention is illustrated by the annexed drawings, which show several forms of construction of the new electrode.

Figure 1:
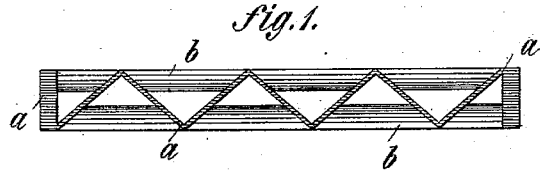
Figure 2:
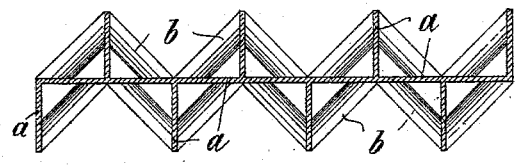

Figure 1 is a horizontal section through the base carrying the active material. Fig. 2 is a like view of a modified construction of the base, and Fig. 3 a similar view of a second modification of the same. Fig. 4 is an elevation of the plate shown in Fig. 2.

Referring more particularly to Figs. 2 and 4, the walls $a$ of the base or plate, which, if desired, may be perforated in an appropriate manner, form angular grooves running from top to bottom. The outer portions of the walls of each of these grooves are connected by strips $b$, which are horizontally located and incline inwardly. When the active material is applied, an intimate contact between the plate proper and the material is thus effected, and the latter is prevented from separating from the plate even when exposed to violent concussion. By means of these strips the active material is held well together and thorough conduction from it insured. The walls of the grooves may be made of extremely thin material without fear of the plate bending, since the construction adopted is exceedingly resistant.

In Fig. 1 an electrode is shown having V-shaped channels, the strips $b$ extending across the top of each V.

Figure 3:
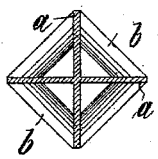
Figure 4:
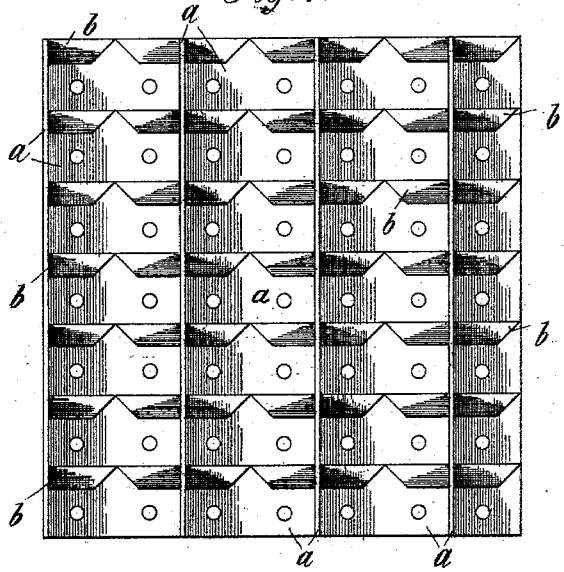

In Fig. 3 the base in plan view displays the form of a cross, and the strips $b$ unite the edges of the four grooves.

It is obvious that other forms of base may be adopted and the strips $b$ correspondingly applied without departure from the essential feature of my invention.

Having now described my invention, I declare that what I claim as new is—

An accumulator-electrode comprising a conducting-base presenting angular grooves extending from the top downward, and substantially horizontal strips, inclining inward and connecting the outer portions of each groove formed by adjacent walls, substantially as and for the purpose hereinbefore set forth.

In testimony whereof I have hereunto signed my name in the presence of two subscribing witnesses.

HERMANN HEINICKE.

Witnesses:
ELSA FORZI,
ENRIQUE WITTE.